(12) United States Patent
Brandenburg

(10) Patent No.: US 7,586,405 B1
(45) Date of Patent: Sep. 8, 2009

(54) MOTORCYCLE AWARENESS SYSTEM

(76) Inventor: Jerry D. Brandenburg, 1767 Corona Ave., Norco, CA (US) 92860

( * ) Notice: Subject to any disclaimer, the term of this patent is extended or adjusted under 35 U.S.C. 154(b) by 112 days.

(21) Appl. No.: 11/398,805

(22) Filed: Apr. 7, 2006

(51) Int. Cl.
B60Q 1/26 (2006.01)

(52) U.S. Cl. .................. 340/468; 340/902; 340/904; 340/942; 340/432; 340/435; 340/469; 362/473; 315/82; 250/336.1; 250/338.1

(58) Field of Classification Search .......... 340/468, 340/902, 904, 942, 432, 435, 469; 362/473; 315/82; 250/336.1, 338.1
See application file for complete search history.

(56) References Cited

U.S. PATENT DOCUMENTS

| | | | | |
|---|---|---|---|---|
| 5,172,113 | A * | 12/1992 | Hamer | 340/907 |
| 5,612,668 | A * | 3/1997 | Scott | 340/426.13 |
| 5,704,707 | A * | 1/1998 | Gebelein et al. | 362/106 |
| 5,926,112 | A | 7/1999 | Hartzell | |
| 5,959,551 | A | 9/1999 | Cardillo | |
| 6,150,931 | A | 11/2000 | Yamagata et al. | |
| 6,707,391 | B1 * | 3/2004 | Monroe | 340/901 |
| 6,731,202 | B1 | 5/2004 | Klaus | |
| 7,079,024 | B2 * | 7/2006 | Alarcon | 340/539.11 |
| 7,126,240 | B2 * | 10/2006 | Albert | 307/10.3 |
| 7,209,221 | B2 * | 4/2007 | Breed et al. | 356/5.02 |
| 2004/0227646 | A1 | 11/2004 | Henry | |
| 2005/0089337 | A1 * | 4/2005 | Itoh et al. | 398/182 |

* cited by examiner

Primary Examiner—Benjamin C. Lee
Assistant Examiner—Ojiako Nwugo

(57) ABSTRACT

A motorcycle awareness system for use when a motorcycle is in operation in conjunction with vehicular traffic is disclosed. The motorcycle awareness system includes an infrared light emitter that is located on the front of a motorcycle, with the infrared light emitter having an internal oscillating motor that is attached to an emitter. The emitter continually emits infrared light in a forward manner once it is turned on and emits this light in a sweeping manner. Vehicles would be equipped with an infrared light receiver, which, when infrared light is received, would activate a number of lights that are attached to the receiver. The lights are preferably either yellow or blue to distinguish these lights from other vehicular lights. When activated, the lights signify the presence of a motorcycle in close proximity to the vehicle, thereby notifying the driver to pay extra attention while driving so as to not endanger the motorcyclist.

12 Claims, 3 Drawing Sheets

MOTORCYCLE AWARENESS SYSTEM

BACKGROUND OF THE INVENTION

The present invention concerns that of a new and improved motorcycle awareness system for use when a motorcycle is in operation in conjunction with vehicular traffic.

DESCRIPTION OF THE PRIOR ART

U.S. Pat. No. 6,731,202 B1, issued to Klaus, discloses a cycle-mounted vehicle proximity warning device that warns a cyclist that a vehicle is approaching the cycle from the rear.

United States Application No. 2004/0227646, issued to Henry, discloses a vehicle safety system used to enhance the safety of motorists by emitting warning signals from a remote unit.

U.S. Pat. No. 6,150,931, issued to Yamagata et al., discloses a mobile unit detection system or information system in which the existence of a car or other mobile unit which must be paid attention to can be detected only upon receiving a necessary signal.

U.S. Pat. No. 5,926,112, issued to Hartzell, discloses a new emergency vehicle warning system for warning vehicles of the approach of an emergency vehicle.

U.S. Pat. No. 5,959,551, issued to Cardillo, discloses a system for warning motorists, especially those who are hearing impaired, of an approaching emergency vehicle.

SUMMARY OF THE INVENTION

The present invention concerns that of a new and improved motorcycle awareness system for use when a motorcycle is in operation in conjunction with vehicular traffic. The motorcycle awareness system includes an infrared light emitter that is located on the front of a motorcycle, with the infrared light emitter having an internal oscillating motor that is attached to an emitter. The emitter continually emits infrared light in a forward manner once it is turned on and emits this light in a sweeping manner. Vehicles would be equipped with an infrared light receiver, which, when infrared light is received, would activate a number of lights that are attached to the receiver. The lights are preferably either yellow or blue to distinguish these lights from other vehicular lights. When activated, the lights signify the presence of a motorcycle in close proximity to the vehicle, thereby notifying the driver to pay extra attention while driving so as to not endanger the motorcyclist.

There has thus been outlined, rather broadly, the more important features of a motorcycle awareness system that the detailed description thereof that follows may be better understood and in order that the present contribution to the art may be better appreciated. There are, of course, additional features of the motorcycle awareness system that will be described hereinafter and which will form the subject matter of the claims appended hereto.

In this respect, before explaining at least one embodiment of the motorcycle awareness system in detail, it is to be understood that the motorcycle awareness system is not limited in its application to the details of construction and to the arrangements of the components set forth in the following description or illustrated in the drawings. The motorcycle awareness system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present motorcycle awareness system. It is important, therefore, that the claims be regarded as including such equivalent constructions insofar as they do not depart from the spirit and scope of the present invention.

It is therefore an object of the present invention to provide a motorcycle awareness system which has all of the advantages of the prior art and none of the disadvantages.

It is another object of the present invention to provide a motorcycle awareness system which may be easily and efficiently manufactured and marketed.

It is another object of the present invention to provide a motorcycle awareness system which is of durable and reliable construction.

It is yet another object of the present invention to provide a motorcycle awareness system which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
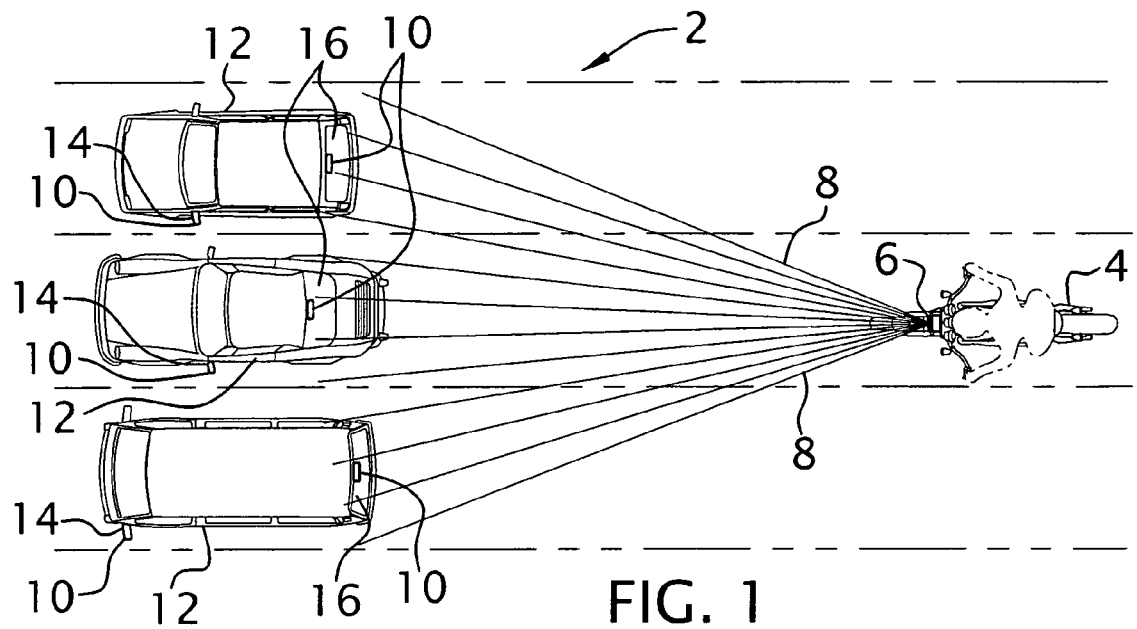
FIG. 1 shows a top view of the motorcycle awareness system as it would appear attached to a motorcycle, as shown with the motorcycle in three lanes of traffic in the same direction.
Figure 2:
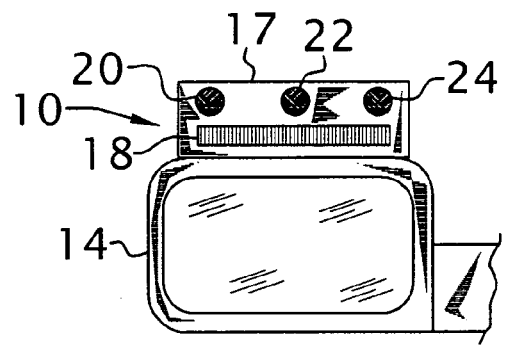
FIG. 2 shows a front view of an infrared light receiver attached to the top of an external rear view mirror attached to a vehicle.
Figure 2A:
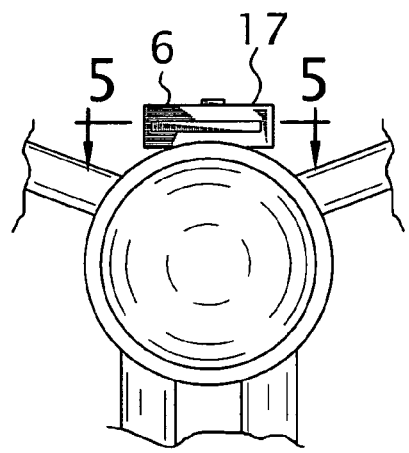
FIG. 2A shows a front view of an infrared light transmitter that is attached to the front of a motorcycle.
Figure 3:
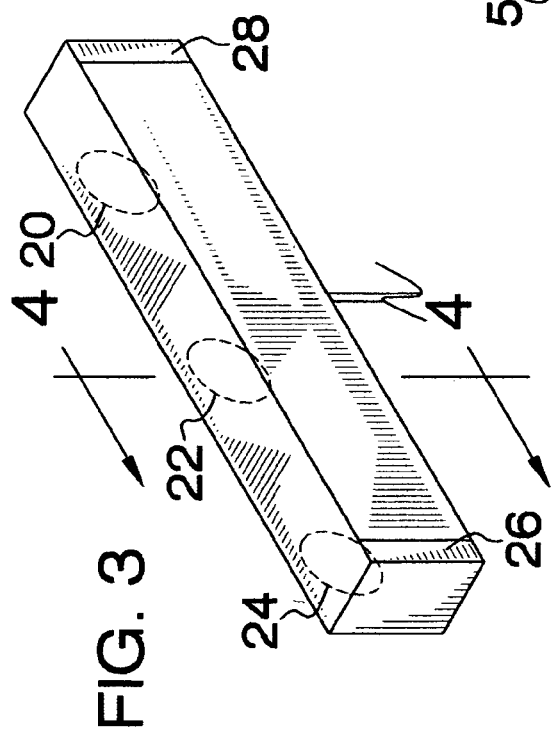
FIG. 3 shows a rear perspective view of an infrared light receiver associated with the motorcycle awareness system.
Figure 5:
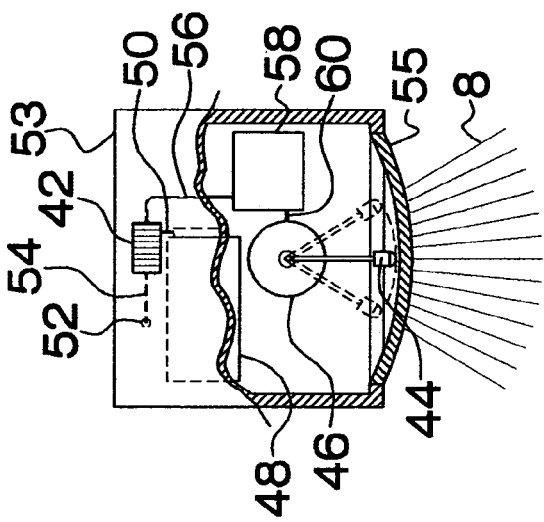
FIG. 5 shows a top cutaway view of an infrared light transmitter that is attached to the front of a motorcycle.
Figure 4:
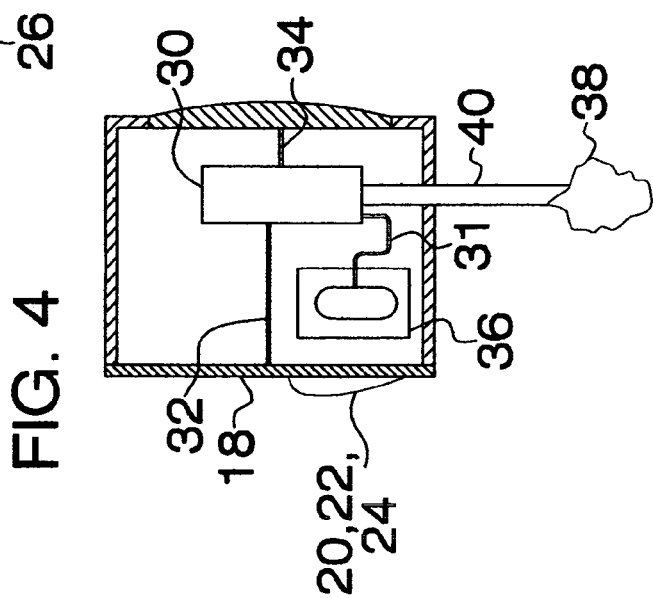
FIG. 4 shows a side cutaway view of an infrared light receiver that would be associated with a vehicle.
Figure 6:
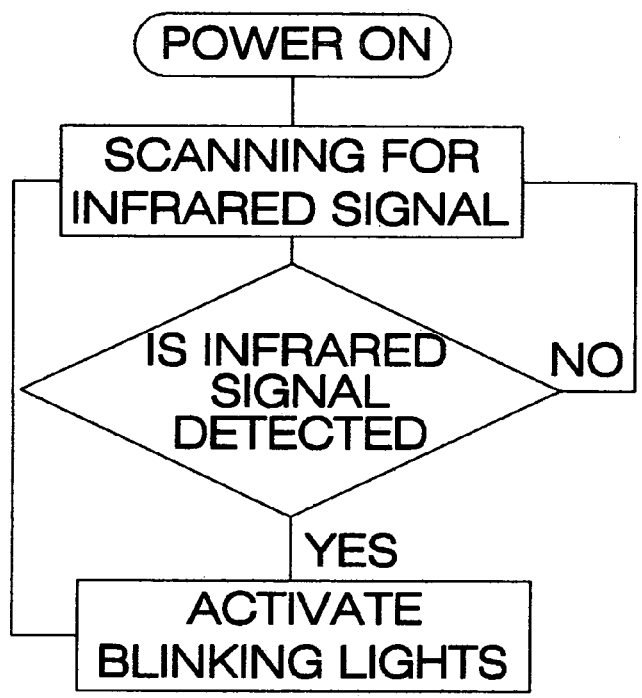
FIG. 6 shows a flowchart diagram of how the infrared light receiver interacts with received infrared red light.
Figure 7:
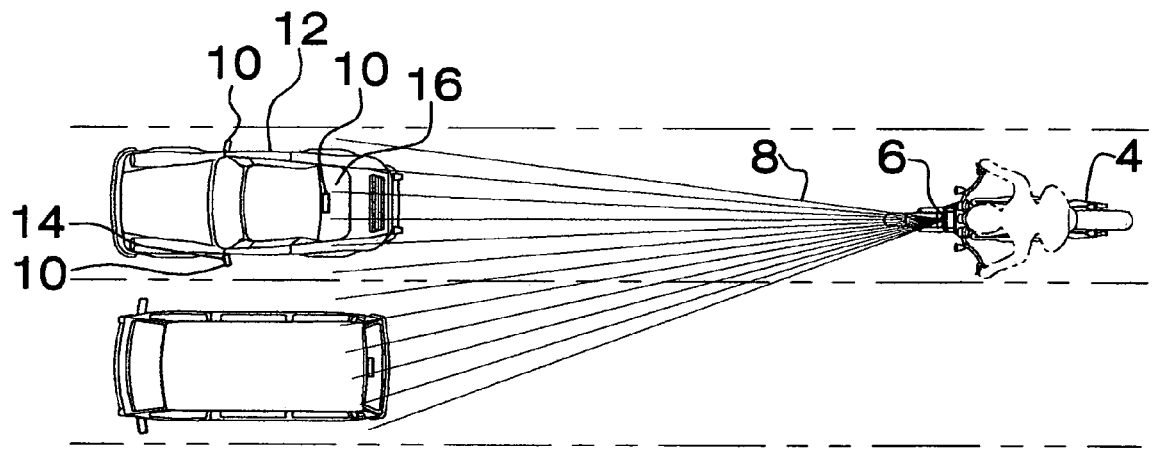
FIG. 7 shows a top view of the motorcycle awareness system as it would appear attached to a motorcycle, as shown with the motorcycle in two lanes of traffic in the same direction.

With reference now to the drawings, and in particular to FIGS. 1 through 7 thereof, a new motorcycle awareness system embodying the principles and concepts of the present invention and generally designated by the reference numeral 2 will be described.

As best illustrated in FIGS. 1 through 7, the motorcycle awareness system 2 is utilized in conjunction with a motorcycle 4 that is used by an individual for riding purposes. On the motorcycle is located a front-mounted infrared light emitter 6 that comprises an external housing 53. Within the housing 53 is located an oscillating motor 46 that is attached to an infrared light emitter 42. The emitter 42 emits infrared light 8 through a front panel 55.

The oscillating motor 46 is connected by at least one wire 60 to circuitry 58 that is located within the housing 53. Power means is used to power the infrared light emitter 6, with the power means preferably being either a replaceable battery 48 located within the housing 53 or a motorcycle battery 52 that is associated with the motorcycle 4. Battery 48 and motorcycle battery 52 are connected to a power switch 42 by wires 50 and 54, respectively. Power switch 42 is connected to circuitry 58 through cable 56.

Power switch 42 is a two-position switch that has two positions comprising an "on" position and an "off" position. In the "on" position, the power switch 42 acts as a closed circuit in between the power means and the circuitry, thereby providing power to the oscillating motor 46 and the emitter 44. In the "off" position, the power switch 42 acts as an open circuit in between the power means and the circuitry, thereby preventing power from reaching the oscillating motor 46 and the emitter 44.

The infrared light emitter 6 used on motorcycles 4 is ideally used in conjunction with a plurality of infrared light receivers 10 that would be placed on vehicles 12. Preferably, at least one infrared light receiver 10 would be placed on each vehicle 12 either at the time of manufacture or as an after-market item. Each infrared light receiver 10 would preferably be attached to either a rear view mirror 4 that would be associated with each vehicle 12 or a rear windshield 16 that would be associated with each vehicle 12.

Each infrared light receiver 10 comprises a housing 17 that has two surfaces comprising a front surface and a rear surface. The infrared light receiver 10 comprises a detector unit 18 that is mounted within the housing 17 and faces outward from the front surface of the housing 17. Furthermore, the infrared light receiver 10 comprises at least three lights 20, 22, and 24 which are also mounted within the housing 18 and face outward from the front surface of the housing 18. The lights 20-24 can be any color but preferably are either a blue or yellow color.

Within the housing 17 is located circuitry 30 that is attached to the detector unit 18 by at least one wire 32. Furthermore, through wire 32, the circuitry 30 is connected to lights 20-24.

Power means is used to power the infrared light receiver 10, with the power means preferably being either a replaceable battery 36 located within the housing 17 or a vehicle battery 38 that is associated with the vehicle 12. Battery 36 and vehicle battery 38 are connected to circuitry 30 by wire 31 and cable 40, respectively.

If the infrared light receiver 10 is utilized in conjunction with the rear windshield 16 of a vehicle 12, then a pair of adhesive strips 26 and 28, located on the rear surface of the housing 17, can be utilized to properly mount the housing infrared light receiver 10. Positioning of the infrared light receiver 10 in such a situation is important and thus, the adhesive strips 26 and 28 will make sure that the infrared light receiver 10 is mounted high enough to properly catch infrared light that is emitted from an infrared light emitter attached to a motorcycle 4.

In use, the motorcycle awareness system 2 is best utilized by a motorcycle 4 in notifying vehicles that are traveling the same direction of travel as the motorcycle 4. Preferably, a motorcyclist will turn on the infrared light emitter 6 when the motorcycle is behind at least one vehicle 12. Then, the infrared light receiver 10 on the vehicle 12 will pick up the infrared light and cause the plurality of lights 20-24 to blink intermittently. These lights will then let any drivers in the affected vehicles 12 know of the presence of the motorcyclist and ideally give the vehicle drivers extra precaution when they are changing lanes, changing speed, or other performing other driving activities.

In an alternative embodiment, the motorcycle awareness system 2 can be used in conjunction with a GPS system. The GPS system would be used to provide further clarification to vehicles of the location of a motorcyclist that may be in close proximity to them.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle awareness system comprising:
  a light emitter, the light emitter being associated with a motorcycle, the motorcycle having a motorcycle battery,
  at least one light receiver, the light receiver being associated with a vehicle, the vehicle including a rear view mirror, the vehicle also including a rear windshield, the vehicle also including a vehicle battery,
  an amount of light emitted from the light emitter,
  detection means on the light receiver for detecting the amount of light emitted from the light emitter, and
  notification means on the light receiver for notifying an individual located in a vehicle of the presence of light emitted from the light emitter,
  wherein the amount of light emitted from the light emitter comprises an amount of infrared light,
  wherein the light emitter further comprises:
    a housing, the housing having a front panel,
    an oscillating motor located within the housing,
    an infrared light emitter attached to the oscillating motor,
    an amount of circuitry attached to the oscillating motor,
    power means for providing power to the circuitry and to the oscillating motor, and
    means for controlling the supply of power from the power means to the circuitry and to the oscillating motor wherein the light receiver further comprises (a) a housing, the housing having at least two surfaces comprising a front surface and a rear surface, (b) a detector located within the housing, wherein the detector is mounted within the housing in such a manner that it faces outward from the front surface of the housing, (c) a plurality of lights located within the housing, wherein the plurality of lights are mounted within the housing in such a manner that they face outward from the front surface of the housing, (d) an amount of circuitry attached to the detector, the circuitry also being attached each light of the plurality of lights, and (e) power means for providing power to the circuitry attached to the detector.

2. A motorcycle awareness system according to claim 1 wherein the means for controlling the supply of power from the power means to the circuitry and to the oscillating motor further comprises a power switch, the power switch comprising two positions, an "on" position and an "off" position, wherein the power switch acts as a closed circuit in the "on" position between the power means and the circuitry, thereby providing power to the oscillating motor and the emitter, and further wherein the power switch acts as an open circuit in the "off" position between the power means and the circuitry, thereby preventing power from reaching the oscillating motor and the emitter.

3. A motorcycle awareness system according to claim 2 wherein the power means for providing power to the circuitry and to the oscillating motor comprises a replaceable battery located within the housing.

4. A motorcycle awareness system according to claim 2 wherein the power means for providing power to the circuitry and to the oscillating motor comprises the motorcycle battery associated with the motorcycle.

5. A motorcycle awareness system according to claim 1 wherein the light receiver is mounted on the rear windshield of the vehicle.

6. A motorcycle awareness system according to claim 1 wherein the light receiver is mounted on the rear view mirror of the vehicle.

7. A motorcycle awareness system according to claim 1 wherein the power means for providing power to the circuitry attached to the detector further comprises a replaceable battery located within the housing associated with the light receiver.

8. A motorcycle awareness system according to claim 7 wherein each of the lights of the plurality of lights comprises a blue light.

9. A motorcycle awareness system according to claim 7 wherein each of the lights of the plurality of lights comprises a yellow light.

10. A motorcycle awareness system according to claim 1 wherein the power means for providing power to the circuitry attached to the detector further comprises the vehicle battery that is associated with the vehicle.

11. A motorcycle awareness system according to claim 10 wherein each of the lights of the plurality of lights comprises a blue light.

12. A motorcycle awareness system according to claim 10 wherein each of the lights of the plurality of lights comprises a yellow light.

* * * * *